United States Patent
Larsson et al.

(10) Patent No.: US 9,374,747 B2
(45) Date of Patent: Jun. 21, 2016

(54) NETWORK NODE, USER NODE AND METHODS FOR CHANNEL ESTIMATION

(71) Applicant: Telefonaktiebolaget L M Ericsson (publ), Stockholm (SE)

(72) Inventors: Erik Larsson, Uppsala (SE); Michael Samuel Bebawy, San Jose, CA (US); Peter Von Wrycza, Stockholm (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 228 days.

(21) Appl. No.: 14/125,686

(22) PCT Filed: Aug. 21, 2013

(86) PCT No.: PCT/SE2013/050986
§ 371 (c)(1),
(2) Date: Dec. 12, 2013

(87) PCT Pub. No.: WO2014/070069
PCT Pub. Date: May 8, 2014

(65) Prior Publication Data
US 2015/0350979 A1    Dec. 3, 2015

Related U.S. Application Data

(60) Provisional application No. 61/721,573, filed on Nov. 2, 2012.

(51) Int. Cl.
*H04W 80/04* (2009.01)
*H04W 36/30* (2009.01)
(Continued)

(52) U.S. Cl.
CPC ........... *H04W 36/04* (2013.01); *H04L 25/0224* (2013.01); *H04W 24/02* (2013.01); *H04W 36/165* (2013.01); *H04W 36/18* (2013.01); *H04W 88/08* (2013.01)

(58) Field of Classification Search
CPC ..... H04W 28/04; H04W 72/04; H04W 36/10; H04W 36/24; H04W 36/30; H04W 36/18; H04W 24/00
See application file for complete search history.

(56) References Cited

U.S. PATENT DOCUMENTS

2008/0098433 A1* 4/2008 Hardacker ............. H04N 7/163 725/52
2010/0069083 A1* 3/2010 Wei ..................... H04W 72/085 455/452.2

(Continued)

FOREIGN PATENT DOCUMENTS

WO    2012096601 A1    7/2012

OTHER PUBLICATIONS

Author Unknown, "Energy Requirements for UL HS-DPCCH Signaling With and Without Special Pilot Bits," Lucent Technologies; 3GPP TSG-RAN WG1#24; R1-02-0421; Feb. 18-22, 2002. pp. 1-9. Orlando, FL, USA.

(Continued)

*Primary Examiner* — Andrew Lee
(74) *Attorney, Agent, or Firm* — Murphy, Bilak & Homiller, PLLC

(57) ABSTRACT

A method in a network node for estimating a channel from a user node to the network node is provided. The network node receives first pilots. The network node receives (502) additional pilots from the user node. The network node estimates (503) the channel based on the additional pilots. The additional pilots are any one out of:
pilots in an existing channel, modified to create space for the additional pilots, and
an existing mechanism modified to be used as the additional pilots.

18 Claims, 11 Drawing Sheets

(51) Int. Cl.
*H04W 36/04* (2009.01)
*H04W 24/02* (2009.01)
*H04L 25/02* (2006.01)
*H04W 36/16* (2009.01)
*H04W 36/18* (2009.01)
*H04W 88/08* (2009.01)

(56) References Cited

U.S. PATENT DOCUMENTS

| | | | |
|---|---|---|---|
| 2010/0074120 A1 | 3/2010 | Bergman et al. | |
| 2010/0074344 A1 | 3/2010 | Wang et al. | |
| 2010/0111044 A1* | 5/2010 | Kawamura | H04B 1/7103 370/335 |
| 2011/0111044 A1* | 5/2011 | Zhao | A61K 9/127 424/502 |
| 2013/0094450 A1* | 4/2013 | Umesh | H04W 52/242 370/329 |
| 2013/0308553 A1* | 11/2013 | Cozzo | H04L 1/0027 370/329 |
| 2014/0329553 A1* | 11/2014 | Nakashima | H04W 52/365 455/522 |
| 2015/0036631 A1* | 2/2015 | Yang | H04L 27/2601 370/329 |

OTHER PUBLICATIONS

Guey, J., et al., "Adaptive Pilot Allocation in Downlink OFDM," Wireless Communication and Networking Conference, 2008. WCNC 2008. IEEE. Mar. 31-Apr. 3, 2008. pp. 840-845. Las Vegas, NV, USA.

Author Unknown, "HS-DPCCH Power Control Using the Special Pilot Bits in HS-DPCCH (Revision of R1-02-0562)," Samsung, Motorola; 3GPP TSG-RAN WG1 #25; Tdoc R1-02-0636; Apr. 9-12, 2002. pp. 1-7. Paris, France.

Author Unknown, "MIMO WITH 64QAM doe HSUPA, Core" Nokia Siemens Networks; 3GPP TSG RAN Meeting #54; RP-111642. Dec. 6-9, 2011. pp. 1-6. Berlin, Germany.

Author Unknown, "MIMO WITH 64QAM doe HSUPA, Feature" Nokia Siemens Networks; 3GPP TSG RAN Meeting #54; RP-111642. Dec. 6-9, 2011. pp. 1-6. Berlin, Germany.

Author Unknown, "MIMO WITH 64QAM doe HSUPA, Performance" Nokia Siemens Networks; 3GPP TSG RAN Meeting #54; RP-111642. Dec. 6-9, 2011. pp. 1-6. Berlin, Germany.

3rd Generation Partnership Project, "3GPP TS 25.213 V11.3.0 (Sep. 2012)," 3rd Generation Partnership Project; Technical Specification Group Radio Access Network; Spreading and modulation (FDD) (Release 11). Sep. 2012. pp. 1-43.

3rd Generation Partnership Project, "3GPP TS 25.214 V11.3.0 (Sep. 2012)," 3rd Generation Partnership Project; Technical Specification Group Radio Access Network; Physical layer procedures (FDD) (Release 11). Sep. 2012. pp. 1-112.

Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

* cited by examiner

NETWORK NODE, USER NODE AND METHODS FOR CHANNEL ESTIMATION

TECHNICAL FIELD

Embodiments herein relate to a network node, a user node and methods therein. In particular, it relates to estimating a channel from the user node to the network node.

BACKGROUND

Wireless devices for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B Node", Base Transceiver Station (BTS), or AP(Access Point), depending on the technology and terminology used. The base stations may be of different classes such as e.g. macro NodeB, home NodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies. A Radio Network Controller (RNC) is a governing element in the UMTS radio access network and is responsible for controlling the Node Bs that are connected to it. The RNC carries out radio resource management, some of the mobility management functions and is the point where encryption is done before user data is sent to and from the mobile. The RNC connects to a Circuit Switched Core Network through Media Gateway (MGW) and to a SGSN (Serving GPRS Support Node) in a Packet Switched Core Network.

Soft HandOver (SHO), also referred to as macro diversity, and fast closed-loop power control are essential features of WCDMA and Enhanced UL (EUL). Soft handover is a feature in which a UE is simultaneously connected to two or more cells. This means that data is received simultaneously in multiple cells, which provides diversity gains. Typically it is distinguished between soft and softer handover, where softer handover refers to the case when the SHO cells belong to the same site, e.g. NodeB, whereas in soft handover the cells can belong to different sites, e.g. NodeBs. FIG. 1 illustrates SHO operation for a traditional High Speed Packet Access (HSPA) deployment scenario with two nodes, a macro node of a serving cell and a macro node of a non-serving cell, having a similar transmit power level. The main difference between Macro, Micro, Pico nodes is the output power, and the more output power the larger coverage area. A Macro has typically 20 W or 40 W, i.e. 43 dBm or 46 dBm or a power in-between or similar. Ideally, a UE moving from the serving cell towards the non-serving cell will enter a SHO region at point A. This may be referred to as Event 1a. At point B also referred to as Event 1d, a serving cell change will occur, i.e. a non-serving cell becomes a serving cell and vice versa. At point C also referred to as Event 1b, the UE will leave the SHO region. It is the Radio Network Controller (RNC) that is in control of reconfigurations, which implies rather long delays for e.g. performing a cell change. During SHO, the UE is power-controlled by the best uplink cell. Since the nodes have roughly the same transmit power in FIG. 1, the optimal DL and UL cell borders will coincide, i.e. the path loss from the UE to the two nodes will be equal at point B. Hence, in an ideal setting and from a static, such as long-term fading, point of view, the serving cell will always correspond to the best uplink. However, in practice, due to imperfections such as e.g. reconfiguration delays, and fast fading, the UE may be power controlled by the non-serving cell during SHO. In such case there may be problems to receive essential control channel information in the serving cell due to the weaker link between the serving cell and UE. For example, High Speed Dedicated Physical Control Channel (HS-DPCCH) and scheduling information need to be received in the serving cell. Possible remedies include increasing gain factors by means of Radio Resource Control (RRC) signaling, utilize repetition or rely on HARQ. The power of each UL physical channel is set relative the DPCCH power by means of its gain factor, i.e. $P\_channel\_X = gain\_factor\_channel\_x^2 \times P_{DPCCH}$, where $P\_X$ denotes the power of channel X. Further details related to gain factors is described in 3GPP 25.213 version 11.3.0, and 25.214 version 11.3.0. Note though that possible imbalances between UL and DL are mainly caused by fast fading in a traditional deployment, whereas for other scenarios, e.g. heterogeneous networks, other factors make the imbalance more pronounced.

During the 3GPP RAN#56 plenary meeting, a Study Item (SI) was initiated on UMTS Heterogeneous Networks, 'RAN Plenary RP-121436, "Study on UMTS Heterogeneous Networks", Huawei, HiSilicon.Deployment of Low-Power Nodes (LPNs) in the heterogeneous networks is seen as a powerful tool to meet the ever-increasing demand for mobile broadband services. A LPN may correspond, for example, to a Remote Radio Unit (RRU), a pico base station or a micro base station, allowing expanding the network capacity in a cost-efficient way. RRU is a radio transceiver capable of handling multiple UEs simultaneously. Typically, several RRUs are connected to and controlled by a single central controller. A network comprising traditional macro nodes such as macro NodeBs, and LPNs is referred to as a heterogeneous network. Two examples of use-cases for heterogeneous network deployment that may be envisioned are coverage holes and capacity enhancement for localized traffic hotspots.

Since the LPNs and macro NodeBs in a heterogeneous network have different transmit powers, the UL and DL cell borders will not necessarily coincide. An example of this is when a UE has a smaller path loss to the LPN, while the strongest received power is from the macro NodeB. Path loss is the reduction in power density of an electromagnetic wave as it propagates through space. Path loss is a major component in the analysis and design of a link budget of a telecommunication system.

In such a scenario, the UL is better served by the LPN while the DL is provided by the serving macro node. This is shown in FIG. 2 which illustrates SHO operation for HSPA in a heterogeneous deployment. The region between the equal path loss border and equal downlink received power, e.g. Common Pilot Channel (CPICH) receive power, border is referred to as imbalance region. In this imbalance region, some fundamental problems may be encountered. For example, a UE in position A would have the macro node as the serving cell, but be power controlled towards the LPN. A UE in SHO is power controlled by several cells, e.g. all cells in the active set. All cells compares the received UE DPCCH power with a SIR target, where the SIR target is set by the RNC. If the received power is larger than the target then the cell orders the UE to reduce its power and vice versa if the received power is less than the target. The UE combines the power control commands from the multiple cells into a single command. It is the strongest link that dictates the power control, i.e. it is enough that one cell orders the UE to decrease its power, while all other cells orders UP for the UE to decrease the power. Due to the UL-DL imbalance the UL towards the serving macro node will be very weak, which means that important control information, such as scheduling information or HS-DPCCH, may not be reliably decoded in the serving cell. Furthermore, a UE in position B will have the macro node as the serving cell, and also be power controlled towards the macro. Due to the UL-DL imbalance, the UE will cause excessive interference in the LPN node. Furthermore, in this scenario the benefits of macro node offloading towards the LPN cannot fully be utilized. One way of improving these problems is to utilize available RNC based cell selection offset parameters. For example, by tuning Cell Individual Offset (CIO) parameter the handover border can be shifted towards the optimal UL border. Handover is based on DL CPICH power. If the UE discovers that the CPICH power from a non-serving cell is stronger than the CPICH from the current serving cell, then the UE will inform the network about this, also referred to as event 1c. The CIO may be used to offset this handover measurement. The CPICH power from one cell, e.g. the LPN, may appear to be stronger or weaker than it actually is, thereby triggering handover earlier or later. There are network parameters that may be used to tune the measurements used in UE event procedures based on the scenario, e.g. Macro-to-Macro, Macro-to-LPN, LPN-to-LPN, etc. The effect of these adjustments is illustrated in FIG. 3. FIG. 3 illustrates SHO operation for HSPA in a heterogeneous deployment with range extension.

These adjustments are beneficial from a system performance point of view, but some difficulties remain:

Scenario 1—A UE in position A may experience a poor DL from the non-serving LPN. This may complicate a reliable detection of UL related DL channels by the UE, e.g. E-HICH and F-DPCH from the LPN.

Scenario 2—A UE in position B has the macro node as serving cell but is in general power controlled towards the LPN. Hence, the uplink signal towards the serving cell may be weak and thereby complicate a reliable reception of control channel information at the serving cell.

Scenario 3—A UE in position C is served by the LPN. However, its DL may be poor and thereby complicate a reliable reception of control information, such as High Speed-Shared Control Channel (HS-SCCH) and Enhanced Absolute Grant Channel (E-AGCH).

Scenario 4—A UE in position D may experience a poor UL towards the non-serving macro cell and thereby complicate the uplink reception at the macro cell.

SUMMARY

To improve the potential gains provided by range extension, at least some of the problems associated with the different scenarios above need to be solved. This will allow not only to optimize the system performance, but also to improve the link quality for UEs experiencing severe degradation in UL or DL. It is therefore an object of embodiments herein to provide a way of improving the performance and robustness in a wireless radio network.

According to a first aspect of embodiments herein, the object is achieved by a method in a network node for estimating a channel from a user node to the network node. The network node receives first pilots.

The network node receives additional pilots from the user node.

The network node estimates the channel based on the additional pilots. The additional pilots are any one out of:
  pilots in an existing channel, modified to create space for the additional pilots, and
  an existing mechanism modified to be used as the additional pilots.

According to a second aspect of embodiments herein, the object is achieved by a method in a user node for enabling a network node to estimate a channel from a user node to the network node. The user node transmits first pilots. The user node transmits additional pilots. The additional pilots enables the network node to estimate the channel based on the additional pilots. The additional pilots are any one out of:
  pilots in an existing channel modified to create space for the additional pilots, and
  an existing mechanism modified to be used as the additional pilots.

According to a third aspect of embodiments herein, the object is achieved by a network node for estimating a channel from a user node to the network node. The network node is configured to receive first pilots. The network node comprises a radio circuitry configured to receive additional pilots from the user node. The radio circuitry is further configured to estimate the channel based on the additional pilots. The additional pilots are any one out of:
  pilots in an existing channel, modified to create space for the additional pilots, and
  an existing mechanism modified to be used as the additional pilots.

According to a fourth aspect of embodiments herein, the object is achieved by a user node for enabling a network node to estimate a channel from a user node to the network node. The user node is configured to transmit first pilots. The user node comprises a radio circuitry configured to transmit additional pilots. The additional pilots enables the network node to estimate the channel based on the additional pilots. The additional pilots are any one out of:

pilots in an existing channel modified to create space for the additional pilots, and an existing mechanism modified to be used as the additional pilots.

The or first pilots have poor quality leading to an inaccurate channel estimate and thereby inadequate detection and demodulation properties of desired physical channels. By using the additional pilots, which are sent with sufficient power, for estimating the channel, the quality of the channel estimate is improved and therefore sufficient detection and demodulation properties are obtained. Note that the enhanced channel estimate may be obtained by the additional pilots alone or a combination of original and additional pilots. This results in that the performance and robustness in the wireless radio network has been improved.

BRIEF DESCRIPTION OF THE DRAWINGS

Examples of embodiments herein are described in more detail with reference to attached drawings in which.

DETAILED DESCRIPTION

Figure 1:
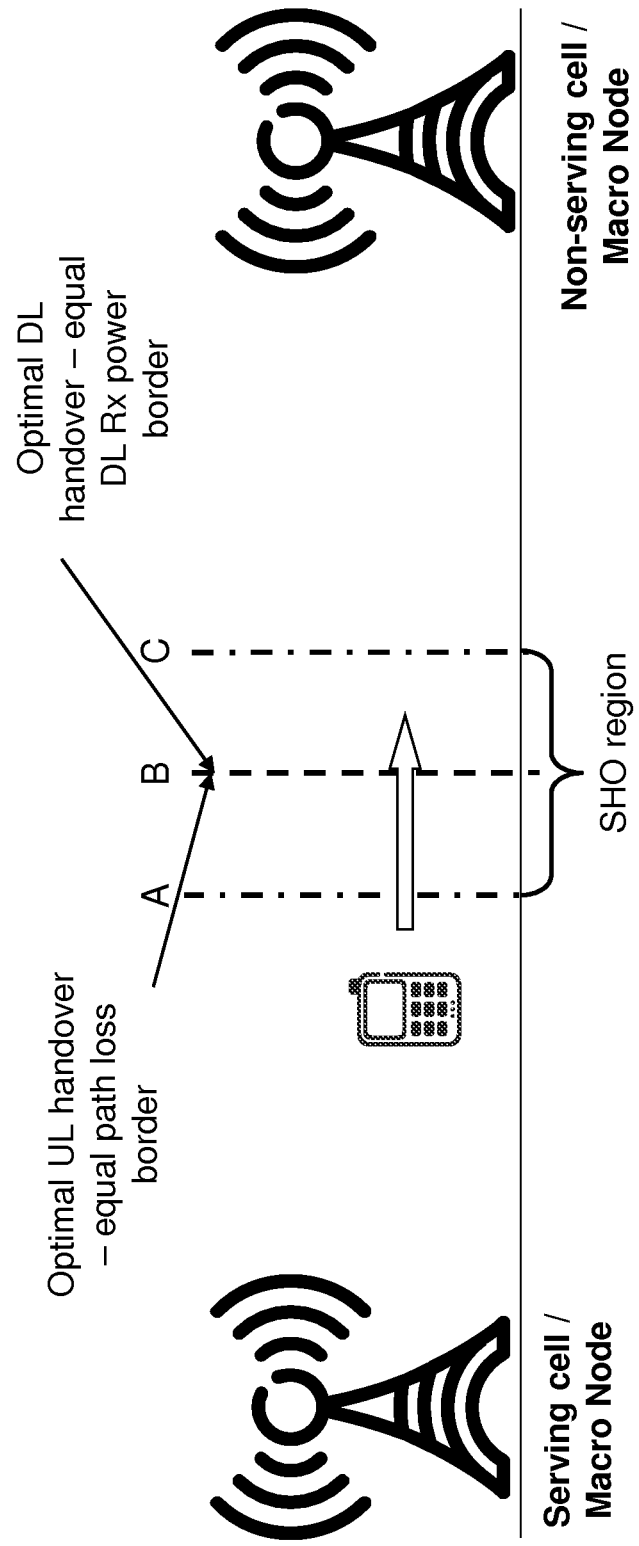
FIG. 1 is a schematic block diagram illustrating SHO operation for HSPA in a macro deployment according to prior art.
Figure 2:
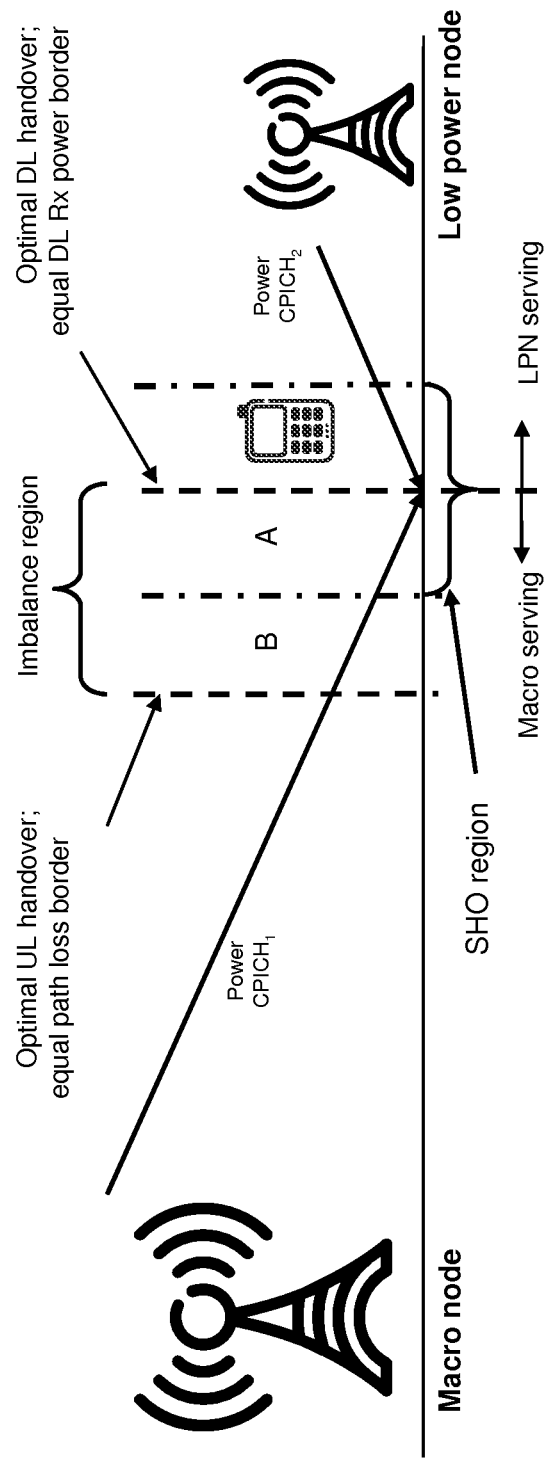
FIG. 2 is a schematic block diagram illustrating SHO operation for HSPA in a heterogeneous deployment according to prior art.
Figure 3:
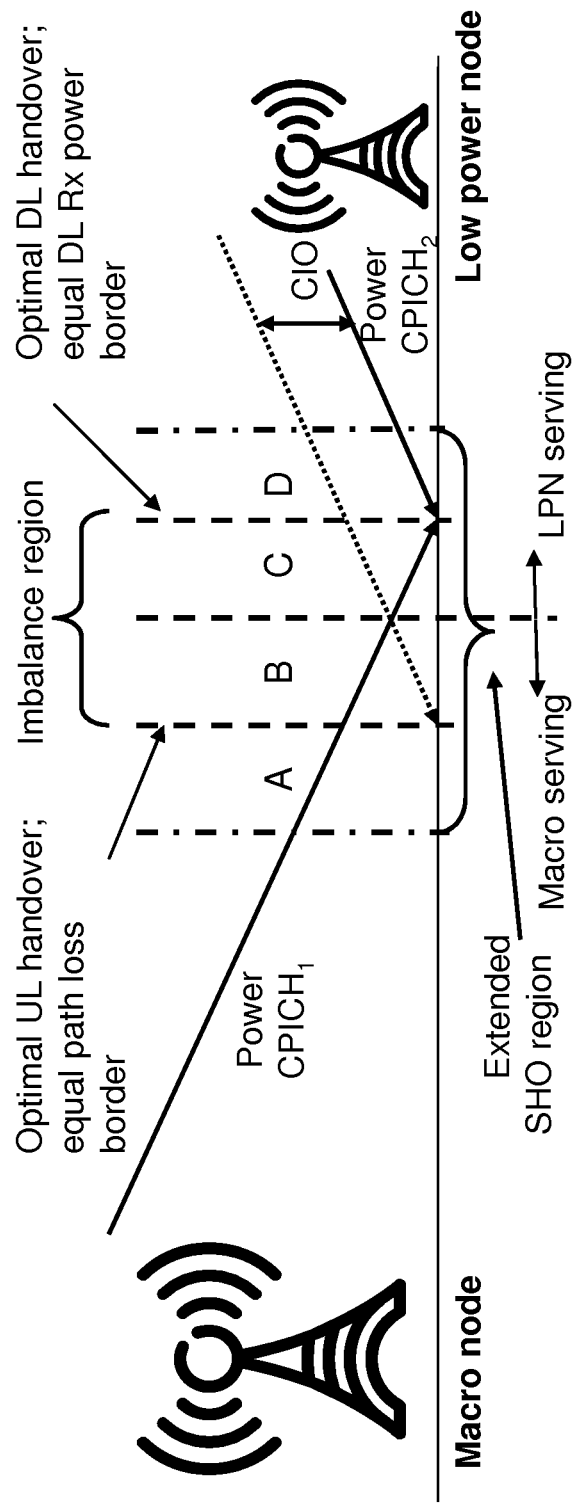
FIG. 3 is a schematic block diagram illustrating SHO operation for HSPA in a heterogeneous deployment with range extension according to prior art.

As part of developing embodiments herein, some problems will first be identified and discussed.

Embodiments herein may addresses scenarios where a user node is connected to several nodes with different link quality, and important control information needs to be received by the network node from the user node over a potentially weak link. For example, in a WCDMA system, a user node in SHO is effectively power-controlled by the best uplink cell. If the best UL is a non-serving cell, one problem is how to ensure that important control information can be reliably received at the serving macro base station. The problem of weak links becomes particularly pronounced whenever the imbalance between the best UL and DL may become large, such as for heterogeneous networks or multi-flow operation. Multi-flow is a recent standardized feature for HSPA that mainly tries to improve the cell edge user experience. There exist many flavours of multi-flow, but in short it may be said that multi-flow enables the possibility to simultaneously schedule independent data streams to a UE from different cells and/or different frequencies, which may be compared with DL MIMO where different data streams are scheduled from the same cell on a single frequency.

As part of developing embodiments herein, a problem will be identified and discussed.

Embodiments herein provides different alternatives for ensuring sufficient channel estimation quality when a communication link is weak. Pilots are traditionally carried on the DPCCH, but in this document new/additional pilots are introduced to enhance a channel estimate.

One solution to the problem of a weak link would be to increase the SIR target or setting a minimum SIR target during SHO with links of different quality. This would mean that all UL channels are power boosted, resulting in an increased reception performance. However, this would also mean that too much power is allocated to the UL channels, and in particular non-essential channels, whenever UL information is not needed to be received. Furthermore this would lead to excessive interference in the LPN. Consequently, a better approach is e.g. to only enhance the performance of essential channels, and e.g. only when important information is transmitted.

For the wireless radio network 100 to be stable and well-performing it is required that important UL control information sent from the user node 120 is reliably received in the serving network node 110. Examples of such information are DL related Acknowledge (ACK)/Not Acknowledge (NACK) information carried on a High Speed (HS) Dedicated Physical Control Channel (DPCCH), EUL control information carried on the Enhanced Dedicated Channel (E-DCH) Dedicated Physical Control Channel (E-DPCCH) and in-band scheduling information conveyed via the E-DCH Dedicated Physical Data Channel (E-DPDCH). A sufficient quality of the channel estimate is essential in order to be able to detect and decode any information.

One approach for enhancing the channel estimate is to enhance the existing pilots carried on the DPCCH by increasing the power of DPCCH. One drawback with this approach is that by increasing the power of DPCCH, the power of all other channels is automatically increased since the power of UL channels is set relative the DPCCH.

Another approach to enhance the channel estimate according to embodiments herein, is to add additional pilots also referred to as new pilots.

Several alternatives for adding new pilots may be envisioned, and the preferred alternative depends on which information that needs to be reliably received. For example, different solutions may be foreseen depending on whether it is only HS-DPCCH that is important or if it is only E-DPCCH or a combination of them.

Below, different alternatives for introducing additional pilots are presented.

Figure 4:
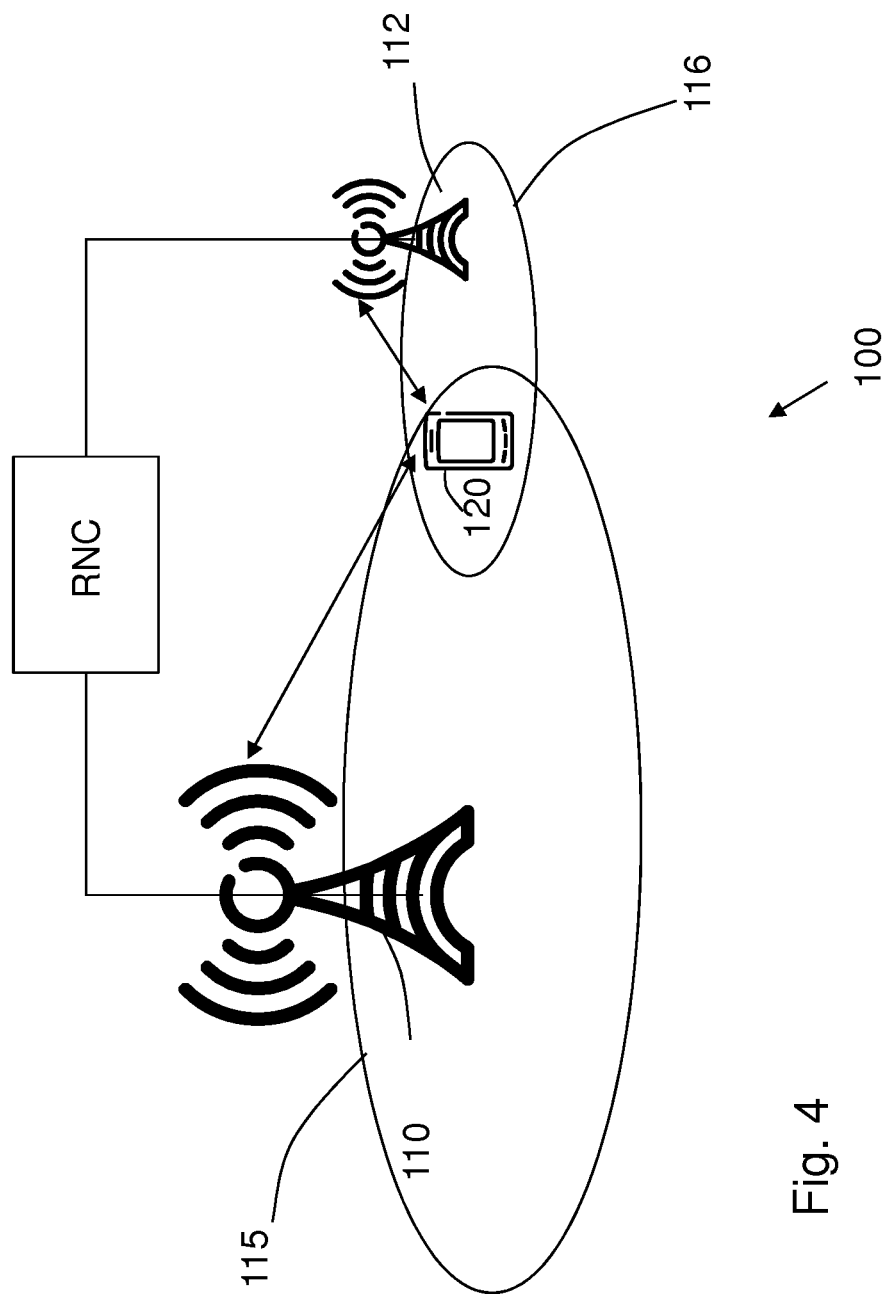
FIG. 4 is a schematic block diagram illustrating embodiments herein.

FIG. 4 depicts a wireless radio network 100 in which embodiments herein may be implemented. The wireless radio network 100 is a wireless communication network such as a WCDMA network. The wireless radio network 100 may be a heterogeneous network or a homogeneous network.

The wireless radio network 100 comprises a plurality of network nodes whereof two network nodes, a first network node which is referred to as the network node 110 and a second network node 112 are depicted in FIG. 4d. The network node 110 and the second network node 112 may each be any one out of a radio base station such as e.g. a NodeB, a macro node, a LPN or any other network node capable to serve a user equipment or a user node in a wireless radio network. The network node 110 according to embodiments herein may in other scenarios be an RNC. As an example, this RNC may be in control of both network nodes 110 and 112. The network node 110 may when being a base station serve a first cell 115. The second network node 112 may when being a base station serve a second cell 116. According to an example scenario depicted in FIG. 4, the network node 110 is a macro node and the second network node 112 is an LPN, but it may as well be the other way around. In most examples herein, the network node 110 is the serving macro cell.

A number of user nodes are located in the wireless radio network 100. In the example scenario of FIG. 4, only one user node is shown, a user node 120 is located in the wireless radio network 100. The user node 120 may be a UE, a mobile station, a telemetry node, a communication node in a car, or any type of node communicating in a radio network system. In the scenario in FIG. 4, the network node 110 is the serving NodeB.

Figure 5:
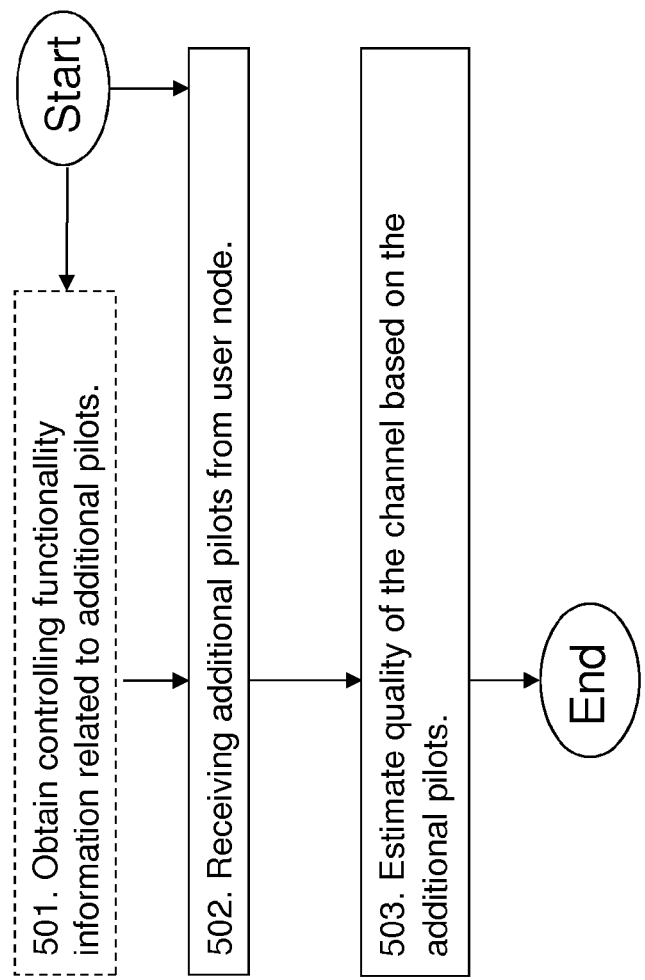
FIG. 5 is a flowchart depicting embodiments of a method in a network node.

Embodiments of methods are described in a general way first, here as seen from the view of the network node 110, then as seen from the view of the user node 120. The methods will then be described more in detail below. Example embodiments of a method in the network node 110 for estimating a channel from the user node 120 to the network node 110, will now be described with reference to a flowchart depicted in FIG. 5. The network node 110 receives first pilots. The first pilots may be transmitted by the user node 120 and may be heard by the network node 110 if the signal strength of the pilot signal is good enough. The network node 110 may make channel estimates based on the first pilots. The first pilots may be referred to as baseline pilots. The first pilots may be carried on the UL DPCCH, channel transmitted by the user node 120 and received by the network node 110.

The method comprises the following actions, which actions may be taken in any suitable order. Dashed lines of some boxes in FIG. 5 indicate that this action is not mandatory.

Action 501

In some embodiments, the additional pilots are managed by allowing the network, such as e.g. the network node 110 to control their operation. This may be done in a semi-statically e.g. using higher-layer signaling or dynamically e.g. using HS-SCCH orders.

One way to manage the additional pilots is to allow the network, such as e.g. the network node 110 to control their operation. This may be done in a semi-statically manner using higher-layer signaling from the RNC, or dynamically by e.g. using HS-SCCH orders transmitted by a NodeB, such as the network node 110 and the second network node 112. Semi-statically is referring to signalling that is handled by the RNC and is typically done quite rarely, e.g. at setup, radio link establishment or re-establishment, whereas dynamic signalling may be much faster and adapt to current radio environment conditions.

Therefore in some embodiments, the network node 110 obtains controlling functionally information related to the additional pilots, to control the operation of the additional pilots. One example of such controlling functionality information may be information on when to trigger and/or release the additional pilots The controlling functionality will be further exemplified below.

Action 502

According to embodiments herein, the network node 110 receives additional pilots from the user node 120. The additional pilots may for example be transmitted because the communication link comprising the first pilots is weak. A sufficient quality of the channel estimate is important in order to be able to detect and decode any information. The additional pilots are transmitted by the user node 120. The additional pilots are any one out of:

pilots in an existing channel, modified to create space for the additional pilots, and an existing mechanism modified to be used as the additional pilots.

In some embodiments, the additional pilots are pilots in an existing channel. The existing channel may be modified by space being created for the additional pilot in the existing channel by a spreading factor being reduced to introduce additional symbols to be treated as the additional pilots by network node 110. This will be further described below.

In some alternative embodiments an existing mechanism is modified to be used as the additional pilots. In one example, the preamble (PRE) and/or postamble (POST) messaging sent by the user node 120 before and after Hybrid Automatic Repeat request (HARQ) ACK/NACK feedback are treated as additional pilots. The POST and/or PRE may be received in a periodic pattern. Examples of this approach will be further described below.

Action 503

As mentioned above, a sufficient quality of the channel estimate is important in order to be able to detect and decode any information. Therefore, the network node 110 estimates the channel based on the additional pilots.

The use of the additional pilots results in an improved channel estimate since the network ensures that the quality such as e.g. signal strength of the additional pilots are good enough, e.g. because additional pilots results in more available pilots, which yields a more accurate channel estimate, more symbols to combine in, for example, a maximum likelihood sense.

Figure 6:
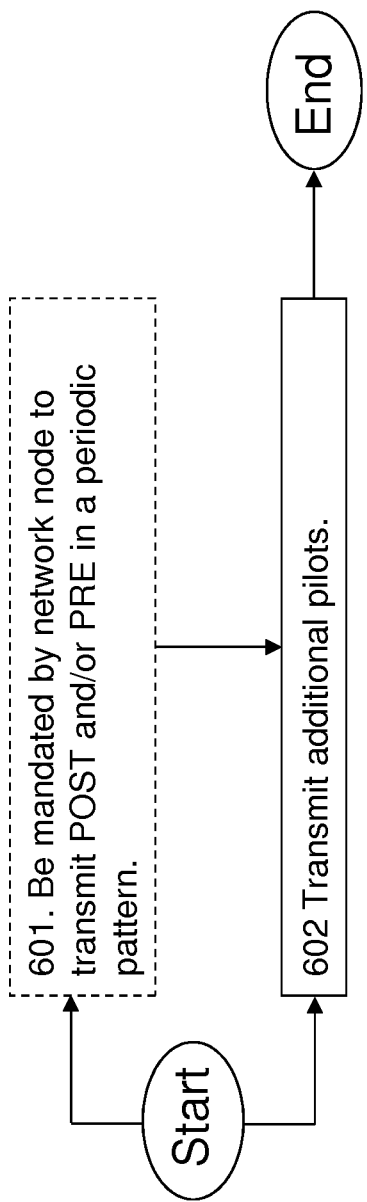
FIG. 6 is a flowchart depicting embodiments of a method in a user node.

Example embodiments of method in a user node 120 for enabling the network node 110 to estimate a channel from a user node 120 to the network node 110, will now be described with reference to a flowchart depicted in FIG. 6. The user node 110 transmits first pilots. As mentioned above the first pilots are transmitted by the user node 120 and may be heard by the network node 110 if the quality of the pilot signal is good enough. The network node 110 may make channel estimation based on the first pilots. The first pilots may be referred to as baseline pilots. The first pilots may be carried on the DPCCH.

The method will now be described in a general way as seen from the view of the user node 120. The method comprises the following actions, which actions may be taken in any suitable order. Dashed lines of some boxes in FIG. 6 indicate that this action is not mandatory.

Action 601

The user node 120 may be mandated by the network node to transmit POST and/or PRE in a periodic pattern. The transmission will be performed in some embodiments of Action 602. For example, the network node 110 enables the use of POST and PRE via RLC signaling. The user node 120 will the transmit POST and PRE before and after the Hybrid-ARQ message according to existing rules. The network node 110 will then treat the POST and PRE messages (symbols) as pilots and use these pilots to estimate the channel estimate. Alternatively, the network may mandate the user node 120 to transmit the POST and/or PRE messages in a deterministic periodic pattern that will be known to all relevant network nodes.

Action 602

The user node 120 transmits additional pilots. The additional pilots enables the network node 110 to estimate she channel based on the additional pilots. The additional pilots may for example be transmitted because the communication link comprising the first pilots is weak. A sufficient quality of the channel estimate is important in order to be able to detect and decode any information. The additional pilots are transmitted by the user node 120. The additional pilots are any one out of:

pilots in an existing channel modified to create space for the additional pilots, and an existing mechanism modified to be used as the additional pilots.

In some embodiments wherein the additional pilots are pilots In an existing channel, the existing channel may be modified by space being created for the additional pilot in the existing channel by a spreading factor being reduced to introduce additional symbols, to be treated as the additional pilots by network node 110. This will be further described below.

In some alternative embodiments wherein an existing mechanism is modified to be used as the additional pilots, the existing mechanism may be a PRE mechanism and/or a POST mechanism. The operation of POST and PRE is to comprise a specific code word before (PRE) an acknowledgement message and a specific code word after (POST) the acknowledgment message. In these embodiments, the POST and/or PRE are transmitted as the additional pilots. This will be further described below.

The POST and/or PRE may be transmitted in a periodic pattern. The user node 120 may have been mandated by the network node 110 in Action 601 to do so.

The methods described in a general way above will now be described more in detail. The description below may refer to any embodiment above.

Below some alternatives for introducing new/additional pilots are presented.

The use of the additional pilots results in an improved channel estimate since the network ensures that the quality, e.g. signal strength of the additional pilots are good enough, e.g. by employing power boosting or because additional pilots results in more available pilots, which yields a more accurate channel estimate, more symbols to combine in, for example, a maximum likelihood sense.

Modifying Existing Channels

Figure 7:
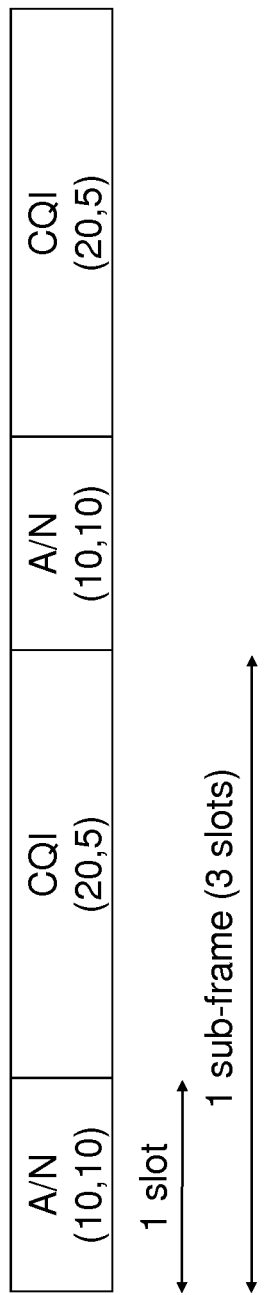
FIG. 7 is a schematic block diagram illustrating embodiments herein.
Figure 8:
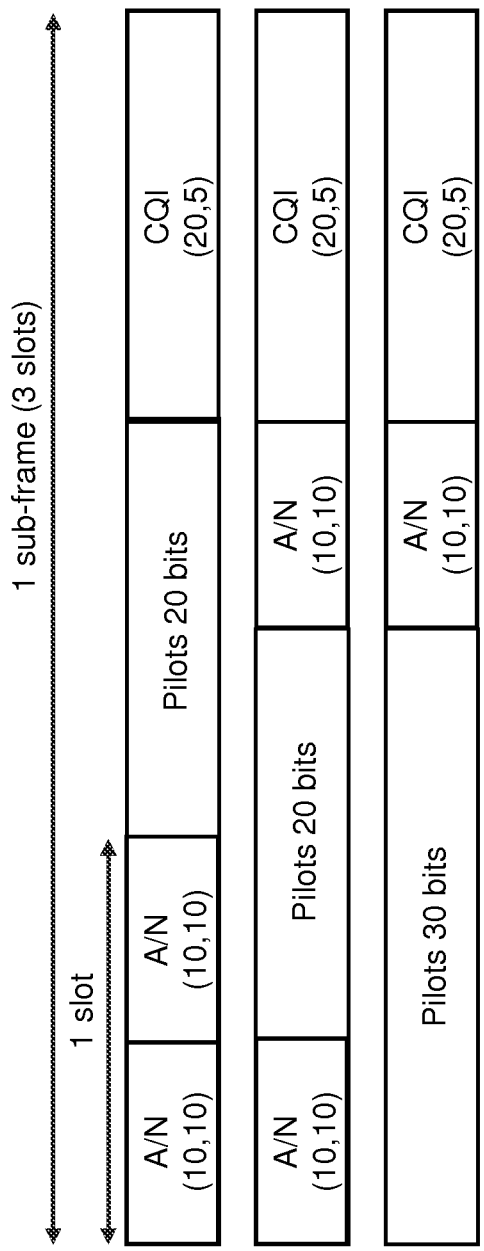
FIG. 8 is a schematic block diagram illustrating embodiments herein.

One alternative for introducing additional pilots is to modify an existing channel in order to create space for pilot symbols. This may for example be performed by reducing a Spreading Factor (SF). The spreading factor is defined as the number of chips per data symbol, and since the chip rate is fixed, it follow that a reduction in SF leads to more symbols per time period. This implies that if the SF if reduced by two, twice as many symbols can be fitted into the channel. These additional symbols being the additional pilots may be treated as known pilot symbols to all relevant network nodes, i.e. the additionally inserted symbols are deterministic and known by all relevant nodes, e.g. user node and the network node 110. Note that pilots included in a particular channel results in a channel estimate that may be used to detect all other channels as well. In principle any of the channels may be modified, but two channels that are particularly interesting to modify are the E-DPCCH and the HS-DPCCH. The Rel-5 HS-DPCCH sub-frame structure comprises one slot ACK/NACK (A/N) information and 2 slots of Channel Quality Indicator (CQI) information, and since a SF of 256 also referred to as SF256, is used each slot corresponds to 10 symbols, see FIG. 7. One slot corresponds to 2560 chips, and therefore one slot corresponds to 2560/256=10 symbols if SF256 is employed. FIG. 7 illustrates Rel-5 HS-DPCCH structure based on SF256. By reducing the spreading factor to 128, twice as many symbols becomes available in each sub-frame. All or a subset of these additional symbols may then be treated as pilots by the network node 110. FIG. 8 illustrates three examples of modified HS-DPCCH formats using an SF of 128, also referred to as SF128. One problem with this approach is that the HS-DPCCH format changes depending on the number of downlink carriers. The E-DPCCH carries 10 information bits in each sub-frame 1 happy bit indicating whether the user node 120 would benefit from a higher grant, 2 Retransmission Sequence Number (RSN) bits, and 7 E-DCH Transport Format Combination Indicator (E-TFCI) bits. These 10 information bits are encoded into 30 bits using a second-order Reed-Müller code (referred to as a (30,10) code). By reducing the spreading factor of the E-DPCCH to 128 twice as many symbols will become available. The current E-DPCCH coding structure, a (30,10) code, may be kept, and the remaining 30 bits/symbols can be used as pilots.

Re-use Existing Mechanisms

Figure 9:
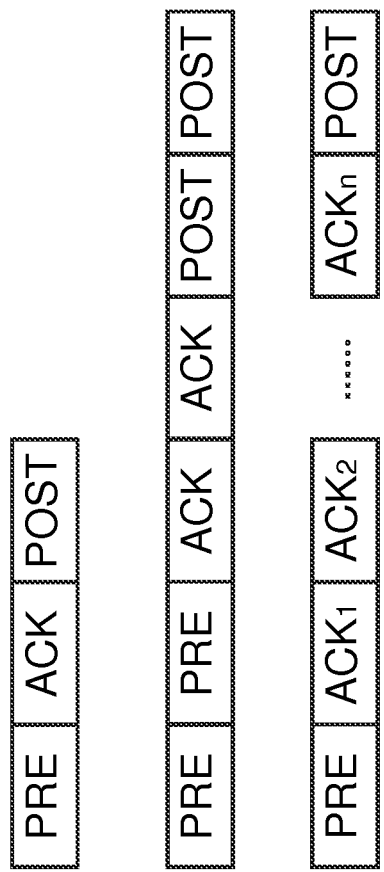
FIG. 9 is a schematic block diagram illustrating embodiments herein.

Yet another alternative is to re-use an existing mechanism to create additional pilots. One example would be to modify the existing POST/PRE mechanism that is used to enhance the DL related HARQ performance by means of offering increased detection performance of HS-DPCCH. The baseline operation of POST and PRE is to send a specific codeword (PRE) before the acknowledgement message (ACK) and a specific codeword (POST) after the acknowledgment message; see FIG. 9 for some illustrations. FIG. 9 illustrates legacy procedures for a POST/PRE operation.

Top figure shows baseline operation with PRE and POST transmitted before and after the actual HARQ message.

Middle figure shows an example with HARQ repetition.

Lower figure shows an example with continuous DL traffic meaning continuous HARQ feedback associated with different data packets. One idea is then that the receiver in the NodeB uses POST and PRE as known pilot symbols. Then by boosting, i.e. increasing the power of HS-DPCCH, you will boost both the pilots i.e. POST/PRE, and the HARQ message and the CQIs. One potential problem is if a UE is scheduled continuously over a very long period. In such a case the UE cannot transmit PRE and POST often, which degrades the channel estimate. The DL scheduler may, however, make sure that if PRE and POST are used as pilots, then a specific user should not be scheduled in too many consecutive Transmission Time Intervals (TTIs). A major benefit with using PRE/POST is that also legacy users can benefit from this embodiment. Using PRE/POST is a proprietary mechanism in the network. One thing to notice is that the channel estimate obtained by using PRE/POST may be used to detect not only HS-DPCCH, but also other UL channels. Note that the channel estimate obtained from PRE/POST may be combined with other channel estimates e.g. DPCCH based. The combination may preferably be done in a maximum-likelihood fashion making sure that the quality of the channel estimate is taken into account in the combination process.

Problems with using PRE/POST as pilots are that there may be too few symbols by the baseline operation of PRE/POST, there will not be any pilots if no DL related HARQ feedback is transmitted, and there might be very few pilots if a particular user node, such as the user node 120 is scheduled in the DL in many consecutive TTIs. To overcome these potential problems, a possibility may be introduced for the network such as the network node 110 to mandate the user node 120 to transmit PRE/POST or only PRE or only POST in a periodic pattern.

The additional pilots may further be a combination of the pilots in an existing channel, modified to create space for the additional pilots, and -an existing mechanism modified to be used as the additional pilots.

Introduce a New Pilot Channel

A further alternative is to introduce a new pilot channel in the UL. The benefit would be that the network node 110 or user node 120 would have full freedom regarding when to transmit this new channel and what power to allocate to the pilots, without affecting legacy.

Pilot Management

The additional pilots may be managed in different ways and some possibilities, but not restricted to, are listed below. Note that various combinations of the listed ideas are possible.

One way to manage the pilots is to allow the network such as the network node 110 to control their operation. This may be done in a semi-statically e.g. using higher-layer signaling or dynamically e.g. using HS-SCCH orders. The controlling functionality then comprises, but is not limited to:

Information on when to trigger and/or release the additional pilots.

Information on how the additional pilots should be transmitted, e.g. continuously, periodically, using a pre-defined pattern or when important information is conveyed.

Information on which uplink channels the additional pilots should be transmitted, e.g. DPCCH, HS-DPCCH, E-DPCCH and E-DPDCH.

Information on which spreading factor (SF) code that should be used for the additional pilots.

Information on which beta-values that should be used, i.e. the power settings of the additional pilots.

Information on timer settings. These timer settings may be used to control time related aspects of involved mechanisms, e.g. the duration of power boosting, for how long the triggered extra pilots should be used until returning to baseline operation, etc.

Criteria for when to enable the additional pilots include, but are not limited to:

Whenever enabled by higher-layers via e.g. RLC signaling from the network node 110 such as the RNC or enabled by a NodeB using e.g. or HS-SCCH orders.

Whenever the user node 120 enters soft handover from the network node to a target node such as the second network node 120, or whenever the user node 120 enters soft handover involving nodes of different transmit powers (potentially a large imbalance between UL and DL.

Whenever the quality of control channels, e.g. HS-DPCCH or E-DPCCH, becomes bad such as e.g. being below a threshold. Similarly the quality of the E-DPDCH may be used as a trigger. For example, if the serving node such as the network node 110 continuously fails to decode data, it is an indication that the link is poor. Also, if the estimated SIR of the first pilots is well below the SIR target for some time, it is an indication that another node is handling the power control and the own link may be weak.

The functionality may also be triggered by the user node 120, which will be described below.

For example, the user node 120 noticing that the serving cell or any cell is retransmitting too much, and hence deduce that the link towards that network node 110 is poor. The user node 120 informs the RNC via a new message about this, and the RNC commands the user node 120 to use additional pilots and informs the NodeBs about the additional pilots.

Each node such as the network node 110 sends information of its own quality, e.g. channel estimate accuracy or received power strength is sent to the RNC, the serving network node, or all other nodes. The communication may take place using a fast backhaul or via the RNC. From this information the RNC, or the serving cell may deduce whether additional pilots are needed.

Note that similar or inverted criteria may be used for when to stop using the additional pilots.

The ideas presented here can be combined with other solutions e.g. channel boosting. Also the ideas are not only applicable to heterogeneous networks.

Figure 10:
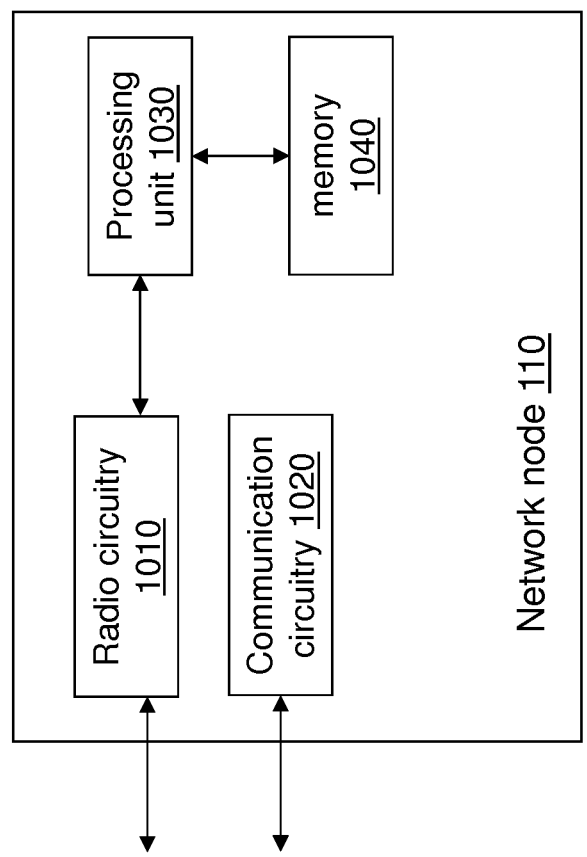
FIG. 10 a schematic block diagram illustrating embodiments of a network node.

To perform the method actions for estimating a channel from a user node 120 to the network node 110 described above in relation to FIG. 5, the network node 110 comprises the following arrangement depicted in FIG. 10. The network node 110 is configured to receive first pilots.

The network node 110 comprises a radio circuitry 1010 configured to receive additional pilots from the user node 120. The radio circuitry 1010 further is configured to estimate the channel based on the additional pilots, wherein the additional pilots are any one out of:

pilots in an existing channel, modified to create space for the additional pilots, and an existing mechanism modified to be used as the additional pilots.

In some embodiments wherein the additional pilots are pilots in an existing channel, the existing channel may be modified by space being created for the additional pilot in the existing channel by a spreading factor being reduced to introduce additional symbols to be treated as the additional pilots by network node 110.

In some other embodiments 12. The network node 110 according claim 10, wherein an existing mechanism is modified to be used as the additional pilots, which existing mechanism is a PRE mechanism And/or a POST mechanism, which operation of POST and PRE is to comprise a specific code word before, PRE, an acknowledgement message and a specific code word after, POST, the acknowledgment message, and wherein the POST and/or PRE are received as the additional pilots. The POST and/or PRE may be received in a periodic pattern.

In some embodiments, the network node 110 further comprises a communication circuitry 1020 configured to obtain controlling functionally information related to the additional pilots, to control the operation of the additional pilots.

The embodiments herein handling the process of estimating a channel from a user node 120 to the network node 110 may be implemented through one or more processors, such as a the processing unit 1130 in the network node 110 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1030 comprising one or more memory units. The memory 1030 is arranged to be used to store, information, data, configurations, schedulings, and applications to perform the methods herein when being executed in the network node 110.

Those skilled in the art will also appreciate that the radio circuitry 1010, and the communication circuitry 1020 described above may refer to a combination of analog and digital circuits, and/or one or more processors configured with software and/or firmware, e.g. stored in the memory 1030, that when executed by the one or more processors such as the processing unit 1040 as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 11:
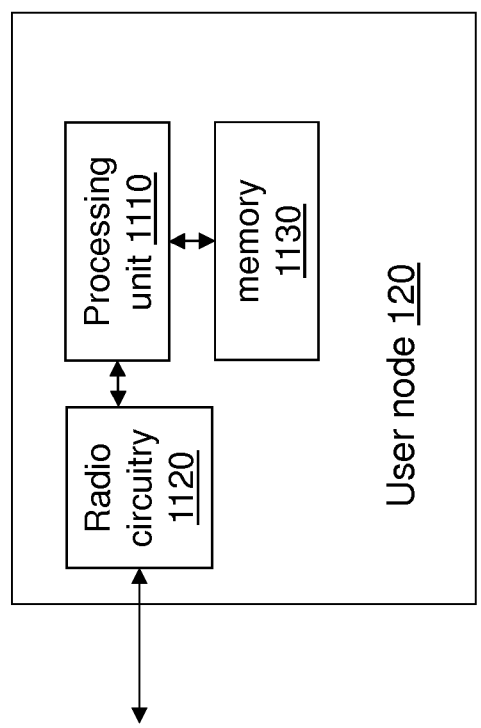
FIG. 11 a schematic block diagram illustrating embodiments of a user node.

To perform the method actions for enabling a network node 110 to estimate a channel from a user node 120 to the network node 110, described above in relation to FIG. 6, the user node 120, comprises the following arrangement depicted in FIG. 11. As mentioned above the DPCCH is configured to have a first power. The user node 110 is configured to transmit first pilots.

The user node 120 comprises a radio circuitry 1120 configured to transmit additional pilots. The additional pilots enables the network node 110 to estimate the channel based on the additional pilots. The additional pilots are any one out of:
  pilots in an existing channel modified to create space for the additional pilots, and
  an existing mechanism modified to be used as the additional pilots.

In some embodiments, wherein the additional pilots are pilots in an existing channel, the existing channel may modified by space being created tor the additional pilot in the existing channel by a spreading factor being reduced to introduce additional symbols, to be treated as the additional pilots by network node 110.

In some embodiments, wherein an existing mechanism is modified to be used as the additional pilots, which existing mechanism is a PRE mechanism and/or a POST mechanism, which operation of POST and PRE is to comprise a specific code word before, PRE, an acknowledgement message and a specific code word after, POST, the acknowledgment message, and wherein POST and/or PRE are transmitted as the additional pilots. The user node 120 may transmit the POST and/or PRE in a periodic pattern.

The embodiments herein handling the process of enabling a network node 110 to estimate a channel from a user node 120 may be implemented through one or more processors, such as a the processing unit 1110 in the user node 120 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the user node 120. One such carrier may be in the form of a CD ROM disc. It is however feasible with other data carriers such as a memory stick. The computer program code may furthermore be provided as pure program code on a server and downloaded to the user node 120.

The user node 120 may further comprise a memory 1130 comprising one or more memory units. The memory 1130 is arranged to be used to store information, data, configurations, schedulings, and applications to perform the methods herein when being executed in the user node 120.

Those skilled in the art will also appreciate that the radio circuitry 1120, described above may refer to a combination of analog and digital circuits, and/or one or more processors configured with software and/or firmware, e.g. stored in the memory 1130, that when executed by the one or more processors such as the processing unit 1110 as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

ABBREVIATIONS

HSDPA High Speed Downlink Packet Access
E-DPCCH E-DCH Dedicated Physical Control Channel
S-E-DPCCH Secondary E-DCH Dedicated Physical Control Channel
E-HICH E-DCH HARQ Acknowledgement Indicator Channel
MIMO Multiple input multiple output
HARQ Hybrid automatic repeat request
HARQ_RTT The number of HARQ processes per HARQ entity is equal to the HARQ round-trip-time
MAC Medium Access Control
NAK non-acknowledgement
ACK acknowledgement
UE User Equipment
WCDMA Wideband Code Division Multiple Access
SHO Soft handover
UL uplink
DL downlink
DPCCH Dedicated Physical Control Channel
EUL Enhanced uplink
HSPA High Speed Packet Access
RNC Radio Network Controller
HS-DPCCH Dedicated Physical Control Channel (uplink) for HS-DSCH
RRC Radio Resource Control
LPN Low-power node
RRU Remote Radio Unit
CPICH Common Pilot Channel
CIO Cell Individual Offset
F-DPCH Fractional Dedicated Physical Channel
F-TPICH Fractional Transmitted Precoding Indicator Channel
HS-SCCH Shared Control Channel for HS-DSCH
E-AGCHE-DCH Absolute Grant Channel
SIR Signal-to-interference ratio
Tx Transmit
Rx Receive
TFC Transport Format Combination
SNR Signal-to-noise ratio
SINR Signal-to-noise-and-interference ratio TPC Transmit Power Control
E-TFC E-DCH Transport Format Combination
NRPM Normalized remaining power marginal
E-DPDCH E-DCH Dedicated Physical Data Channel
CQI Channel Quality Indicator
SF Spreading Factor
RSN Retransmission Sequence Number
E-TFCI E-DCH Transport Format Combination Indicator
TTI Transmission Time Interval
OLPC Outer Loop Power Control
CRC Cyclic Redundancy Check
TBS Transport block size
RoT Rise-over-thermal

The invention claimed is:

1. A method in a network node for estimating a channel from a user node to the network node, wherein the network node receives first pilots from the user node, the method comprising:
receiving additional pilots from the user node; and
estimating the channel based on the additional pilots;
wherein the additional pilots are any one out of:
pilots in an existing channel that is modified to create space for the additional pilots; and
an existing mechanism modified to be used as the additional pilots.

2. The method according to claim 1, wherein the additional pilots are pilots in an existing channel, and wherein the existing channel is modified by space being created for the additional pilots in the existing channel, based on a spreading factor of the existing channel being reduced to introduce additional symbols to be treated as the additional pilots by the network node.

3. The method according claim 1, wherein an existing mechanism is modified to be used as the additional pilots, which existing mechanism is at least one of a PRE mechanism and a POST mechanism, wherein the network node treats one or both of PRE and POST messages sent by the user node as the additional pilots.

4. The method according to claim 3, wherein one or both of the PRE and POST messages are received in a periodic pattern.

5. The method according to claim 1, further comprising obtaining information relating to controlling the operation of the additional pilots, said information comprising information on when to trigger transmission or use of the additional pilots for channel estimation by the network node, and triggering transmission or use of the additional pilots based on the information.

6. A method in a user node for enabling a network node to estimate a channel from a user node to the network node, wherein the user node transmits first pilots and the method comprises:
transmitting additional pilots, which additional pilots enable the network node to estimate the channel based on the additional pilots; and
wherein the additional pilots are any one out of:
pilots in an existing channel modified to create space for the additional pilots; and
an existing mechanism modified to be used as the additional pilots.

7. The method according to claim 6, wherein the additional pilots are pilots in an existing channel, and wherein the existing channel is modified by space being created for the additional pilots in the existing channel, based on a spreading factor of the existing channel being reduced to introduce additional symbols, to be treated as the additional pilots by network node.

8. The method according claim 7, wherein an existing mechanism is modified to be used as the additional pilots, which existing mechanism is at least one of a PRE mechanism and a POST mechanism, wherein the user node sends one or both of PRE and POST messages as the additional pilots.

9. The method according to claim 8, wherein the user node transmits one or both of the POST and PRE messages in a periodic pattern.

10. A network node for estimating a channel from a user node to the network node, wherein the network node is configured to receive first pilots from the user node and comprises:
radio circuitry configured to receive additional pilots from the user node; and
wherein the radio circuitry further is configured to estimate the channel based on the additional pilots, and wherein the additional pilots are any one out of:
pilots in an existing channel, modified to create space for the additional pilots; and
an existing mechanism modified to be used as the additional pilots.

11. The network node according to claim 10, wherein the additional pilots are pilots in an existing channel, and wherein the existing channel is modified by space being created for the additional pilot in the existing channel, based on a spreading factor of the existing channel being reduced to introduce additional symbols to be treated as the additional pilots by network node.

12. The network node according claim 10, wherein an existing mechanism is modified to be used as the additional pilots, which existing mechanism is at least one of a PRE mechanism and a POST mechanism, wherein the network node treats one or both of PRE and POST messages sent by the user node as the additional pilots.

13. The network node according to claim 12, wherein one or both of the POST and PRE messages are received in a periodic pattern.

14. The network node according to claim 10, further comprising:
communication circuitry configured to obtain information relating to controlling the operation of the additional pilots, said information comprising information on when to trigger transmission or use of the additional pilots for channel estimation by the network node; and
wherein the network node is configured to trigger transmission or use of the additional pilots based on the information.

15. A user node for enabling a network node to estimate a channel from a user node to the network node, wherein the user node is configured to transmit first pilots and comprises:
radio circuitry configured to transmit additional pilots, which additional pilots enable the network node to estimate the channel based on the additional pilots; and
wherein the additional pilots are any one out of:
pilots in an existing channel modified to create space for the additional pilots; and
an existing mechanism modified to be used as the additional pilots.

16. The user node according to claim 15, wherein the additional pilots are pilots in an existing channel, and wherein the existing channel is modified by space being created for the additional pilot in the existing channel, based on a spreading factor of the existing channel being reduced to introduce additional symbols to be treated as the additional pilots by network node.

17. The user node according claim 15, wherein an existing mechanism is modified to be used as the additional pilots, which existing mechanism is at least one of a PRE mechanism and a POST mechanism, wherein the user node sends one or both of PRE and POST messages as the additional pilots.

18. The user node according to claim 17, wherein one or both of the POST and PRE messages are transmitted by the user node in a periodic pattern.

* * * * *